United States Patent [19]

Kano et al.

[11] 4,042,527

[45] Aug. 16, 1977

[54] PROCESS OF PREPARING INFRARED-EXCITABLE SODIUM RARE EARTH FLUORIDE LUMINESCENT MATERIALS

[75] Inventors: Tsuyoshi Kano, Tokyo; Masaki Nakako, Hachioji; Hajime Yamamoto, Tokyo; Yoshiro Otomo, Mitaka, all of Japan

[73] Assignee: Hitachi, Ltd., Japan

[21] Appl. No.: 255,639

[22] Filed: May 22, 1972

[30] Foreign Application Priority Data

May 21, 1971 Japan .................................. 46-34480
Nov. 10, 1971 Japan .................................. 46-89019

[51] Int. Cl.$^2$ ............................................. C09K 11/46
[52] U.S. Cl. .............................................. 252/301.4 H
[58] Field of Search ................................. 252/301.4 H

[56] References Cited

U.S. PATENT DOCUMENTS 3,667,921  6/1972  Grodkiewicz et al. ....... 252/301.4 H

Primary Examiner—Jack Cooper
Attorney, Agent, or Firm—Craig & Antonelli

[57] ABSTRACT

A hexagonal $NaLnF_4:Yb^{3+}, Er^{3+}$ (Ln represents the elements Y, La, Gd and/or Lu) has been found to be an efficient phospor emitting green light with infrared excitation, which can be prepared by firing a mixture of $Na_2SiF_6$ and coprecipitated $Ln_{1-y-z}Yb_yEr_zF_3$. Optimum firing conditions for synthesis of $NaLnF_4:Yb^{3+}, Er^{3+}$ have been found to be such that:

a. the decomposition reaction of $Na_2SiF_6$ to ($2NaF + SiF_4$) is complete,
b. liquid $NaF-Ln_{1-y-z}Yb_yEr_zF_3$ and hexagonal $NaLn_{1-y-z}Yb_yEr_zF_4$ are co-existent, and
c. the hexagonal-to-cubic phase transition does not occur in $NaLn_{1-y-z}Yb_yEr_zF_4$.

When pumped by a Si-doped GaAs diode, properly prepared $NaY_{0.57}Yb_{0.39}Er_{0.04}F_4$ emit under infrared stimulation green light 4 to 5 times as bright as commercially available $LaF_3:Y^{3+}, Er^{3+}$.

6 Claims, 6 Drawing Figures

PROCESS OF PREPARING INFRARED-EXCITABLE SODIUM RARE EARTH FLUORIDE LUMINESCENT MATERIALS

BACKGROUND OF THE INVENTION

This invention relates to an efficient green-emitting luminescent material and to a method for production thereof. More particularly, it relates to such luminescent material which can be exited by infrared stimulation to produce green visible radiation.

So-called infrared radiation-to-visible radiation converting phosphors are excited at two or three stages by two or three photons of infrared radiation, and emit one photon of visible light.

Luminescent materials of high conversion efficiency have recently been developed, and research efforts on them have advanced to such an extent that they can be put into practical use as visible light-emitting diodes in combination with an infrared-emitting diode such as gallium arsenic diode, In addition, such infrared-to-visible converting luminescent materials are expected to be applied for infrared detection as in infrared Lasers, or be utilized as indicating screens excitable with infrared radiation or as Lasers or light sources excitable with infrared radiation.

Typical instances of known green-emitting, infrared-to-visible converting phosphors are a product having a composition expressed by $LnF_3: Yb^{3+}, Er^{3+}$ or $LnF_3:Yb^{3+}, Ho^{3+}$ (wherein Ln is at least one element selected from La, Y, Gd and Lu), as taught in French Pat. No. 2,004,990, and a product having a composition expressed by $BaMF_5:Yb^{3+},Er^{3+}$ or $BaMF_5:Yb^{3+},Ho^{3+}$ (wherein M is at least one element selected from the group consisting of Y, Gd, Ce, Sc, La, Ga, In and Al), as illustrated in West German Laid-Open Specification No. 2,018,352.

Known green-emitting phosphors which are inferior to the above-exemplified ones with respect to brightness of emission, include $LiYF_4:Yb^{3+},Ho^{3+}$ (R. K. Watts, J. Chem. Phys., 53 (9) 3552 (1970)), $Na_{0.5}Y_{0.5}WO_4:Yb^{3+},Er^{3+}$, (J. P. van der Ziel, L. G. Van Uitert, and W. H. Grodkiewicz, Appl. Phys., 41 (8), 3308 (1970)), etc. Even $YF_3:Yb^{3+},Er^{3+}$ or $LaF_3:Yb^{3+},Er^{3+}$, which is known to be a luminescent material producing brightest emission among these known phosphors, is inferior to a GaP:N green emitting diode belonging to the competitive art, with respect to conversion efficiency, when it is pumped by an infrared-emitting diode. Accordingly, development of a novel luminescent material having a higher conversion efficiency has been demanded in the art for broad utilization of light-emitting elements using an infrared-to-visible converting luminescent material.

SUMMARY OF THE INVENTION

Extensive research efforts have been made with a view to obtaining green-emitting, infrared-to-visible converting luminescent materials excellent in emission brightness over conventional products, and as a result, this invention now provides a luminescent material having excellent emission characteristics and emitting very bright visible light.

It is an object of this invention to provide an efficient infrared-stimulable, green visible light-emitting luminescent material having a high emission intensity.

A further object of this invention is to provide a method of producing an efficient infrared-stimulable, green visible light-emitting luminescent material consisting essentially of a sodium rare earth fluoride.

The luminescent material of this invention is characterized by having a hexagonal crystal structure and a composition of a sodium rare earth fluoride expressed by the general formula:

$$NaLn_{1-y-z}Yb_yEr_zF_4$$

wherein Ln is at least one element selected from the group consisting of yttrium, lanthanum, gadolinium and lutetium, and $y$ and $z$ are numerical values meeting the following requirements:

$$0.09 \leq y \leq 0.99,$$
$$0.01 \leq z \leq 0.10,$$

and $$y + z \leq 1.$$

The luminescent material of this invention can be obtained by following a specific preparation process such as described below. More specifically, the luminescent material of this invention is prepared by a method comprising employing a rare earth fluoride coprecipitate having a composition expressed by the general formula: $(Ln_{1-y-z}Yb_yEr_z)F_3$ wherein $y$ and $z$ are numbers meeting the above requirements, as a first raw material and sodium silicofluoride $Na_2SiF_6$ as a second raw material, mixing these materials at a suitable mixing ratio, charging the mixture into a noble metal crucible with a lid, and firing the mixture at a temperature of 600°–950° C. in an oxygen-free atmosphere for a period of time of at least 1 hour, a practical period of time being 1 to 10 hours.

One of the features of the method of this invention is that sodium silicofluoride $Na_2SiF_6$ is used as one of the raw materials. Sodium silicofluoride is thermally decomposed at 600°–630° C. to form NaF (solid) and $SiF_4$ (gas). NaF is included in the intended luminescent material as one of the constituents thereof, and $SiF_4$ forms a fluorizing atmosphere as it is or after it has reacted with water vapor in the firing atmosphere or water contained in the raw materials while yielding HF, so that oxidation of the resulting luminescent material by any oxygen gas impurity contained in the atmosphere can be prevented.

Another feature of this method is that a rare earth fluoride coprecipitate expressed by the general formula $(Ln_{1-y-z}Yb_yEr_z)F_3$ is used as the other or second raw materials. This fluoride coprecipitate may be prepared in the following manner. Oxides of Ln, Yb and Er taken at such a ratio as meeting the above requirements of $y$ and $z$ numerical values are dissolved completely in an aqueous solution of a mineral acid, and the solution is placed into a fluorine-resistant resin vessel. Then, concentrated hydrofluoric acid is added to the solution in an amount slightly excessive over the calculated amount necessary for formation of the rare earth fluoride $(Ln_{1-y-z}Yb_yEr_z)F_3$, thereby to precipitate the rare earth fluoride from the mineral acid aqueous solution. The thus formed precipitate is washed several times with water and dried in the air at a temperature of 100° to 130° C. The resulting rare earth fluoride coprecipitate contains crystal water in an amount of about 0.5 mole per mole of the fluoride. It is permissible to remove this crystal water by heating the rare earth fluoride coprecipitate at about 400° C. in a neutral gas atmosphere, and by using such a heat-treated coprecipitate, the intended bright luminescent material having the above specific composition can be obtained without any disadvantage.

According to the above-mentioned preparation method, it is possible to obtain a green-emitting, infrared-to-visible converting luminescent material characterized by a very bright emission which is not obtained in conventional products. As a result of X-ray diffraction analysis of the crystal structures of luminescent materials prepared by the above method, it has been found that each of the materials has a hexagonal structure belonging to the space group $P\bar{6}$. For comparison, NaF was employed instead of $Na_2SiF_6$ as a second raw material, and mixed with the first raw material, i.e., a rare earth fluoride coprecipitate expressed by the formula $(Ln_{1-y-z}Yb_yEr_z)F_3$, and the mixture was fired together with suitable amounts of ammonium bifluoride $NH_4F \cdot HF$ in a netural gas. However, in the resulting product, the emission intensity was extremely low and this product could not bear comparison with the luminescent material prepared according to the above method of this invention. For another comparison, a mixture of $LnF_3$, $YbF_3$ and $ErF_3$ was employed as the raw material instead of the rare earth fluoride coprecipitate. In this case, a black substance of an unknown composition was frequently formed in the reaction product and it extremely damaged the emission intensity of the product.

Each of the above-mentioned control products is extremely inferior to the product of this invention with respect to the emission intensity, the reason for which has not been determined. It may be, however, presumed that the difference in the preparation method will result in the difference in the crystal structure per se or in the difference in the crystallinity characteristics (for instance, the amount of lattice defects and homogenity of the dopant ions). At any rate, it is true that the luminescent material of this invention having a hexagonal crystal structure belonging to the space group $P\bar{6}$ has an excellent emission intensity.

The presence of oxygen in a gas to be used as the firing atmosphere is not preferred, because it causes oxidation of the fluoride luminescent material. Accordingly, it is desired that the atmosphere gas to be used has been purified prior to the firing operation. For this reason, in this invention it is essential that the firing should be conducted in an oxygen-free atmosphere.

As a result of our further research efforts made on the above preparation method of this invention, an improvement of this method has been found. According to this improved method, it is possible to obtain luminescent materials having improved emission characteristics. This improved second preparation of this invention is characterized by the firing step, especially the way of charging the raw materials into a crucible. More specifically, powder of $Na_2SiF_6$ which is the same as the second raw material, is packed at the bottom of a crucible, and a mixture of first and second raw materials is placed on the layer of $Na_2SiF_6$ powder. In such a state the firing operation is conducted. By this improved method, it is possible to obtain a luminescent material having less deviation in emission brightness and more excellent emission characteristics than the product obtained by the above-mentioned first preparation method of this invention. The amount of $Na_2SiF_6$ powder placed locally below the mixture of the raw materials may be several mole percents to scores of mole percents based on the sum of the mixture of the first and second raw materials, but in general, it is preferred that the amount of sodium silicofluoride powder is 10 to 50 mole % base on the mixture of the first and second raw materials. The background of the development of this improved second method will now be detailed.

In the above-mentioned second method for the synthesis of luminescent materials, $Na_2SiF_6$ which is one of raw materials performs the following functions:

1. It provides sodium (Na) and fluoride (F) which are structural elements of the luminescent material. In other words, $Na_2SiF_6$ is decomposed under heat to NaF and $SiF_4$ according to the following reaction:

$$Na_2SiF_6 \rightarrow 2NaF + SiF_4$$

2. Excessive NaF other than required for formation of the luminescent material forms a eutectic crystal of a low melting point with $NaLn_{1-y-z}Yb_yEr_zF_4$ and promotes the growth of the crystal of the luminescent material by fluxing action at the firing temperature.

3. It forms $SiF_4$ upon its thermal decomposition, which prevents oxidation of the luminescent material caused by the presence of a minute amount of oxygen or water in the atmosphere.

The amount of $Na_2SiF_6$ necessary for the above performance varies depending on each action. For performance of function (1), it is sufficient for $Na_2SiF_6$ to be present in the stoichiometric amount, and a slightly excessive amounts is enough for performance of function (2). However, it is desired that $Na_2SiF_6$ is present in great excess for performance of function (3). The above second method of this invention is characterized in that above function (3) can be performed separately from other functions under certain complicated conditions. More specifically, in accordance with this second method of this invention, great excess of $Na_2SiF_6$ is made present selectively at a special part of the firing crucible, whereby $SiF_4$ gas formed by decomposition thereof is allowed to prevent oxidation of the luminescent material and NaF concurrently formed is separated after the firing operation without any direct contact with the resulting luminescent material or the rare earth fluoride $(Ln_{1-y-z}Yb_yEr_zF_3)$ used as the other raw material, independently from functions (1) and (2). In accordance with the above embodiment of this invention, there may be provided a method capable of producing luminescent materials showing less deviation in the emission brightness and efficiency.

BRIEF DESCRIPTION OF THE DRAWING

The luminescent materials of this invention will further be understood from the following description and by reference to the accompanying drawings wherein.

DESCRIPTION OF PREFERRED EMBODIMENTS

Emission characteristics of luminescent materials prepared by the method of this invention will now be illustrated by reference to $NaY_{1-y-z}Yb_yEr_zF_4$ as a typical instance thereof.

Figure 1:
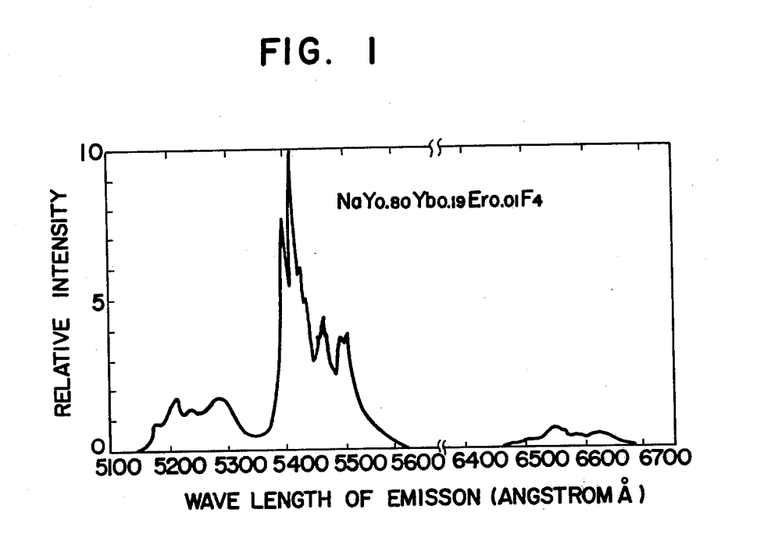
FIG. 1 is a curve illustrating the visible light-emitting spectrum of $NaY_{0.80}Yb_{0.19}Er_{0.01}F_4$, one embodiment of this invention, under infrared stimulation at room temperature.
Figure 2:
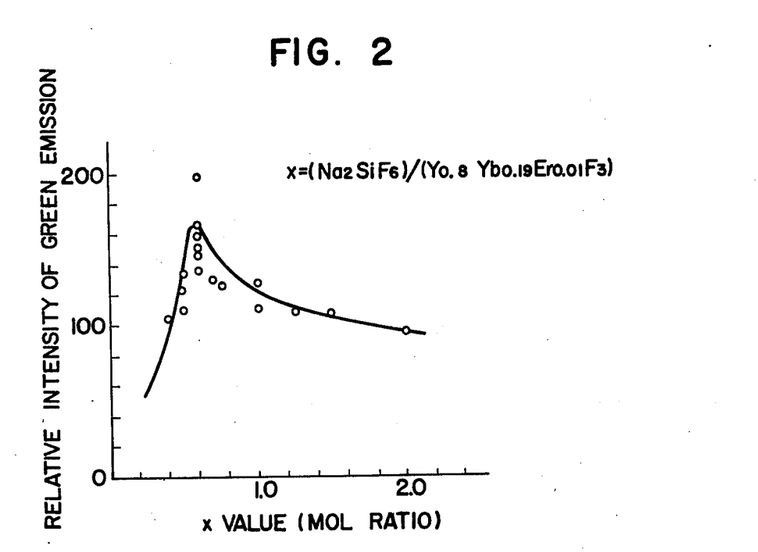
FIG. 2, which illustrates one embodiment of this invention, is a curve showing the relation between the mixing mole ratio $x$ of starting $Na_2SiF_6$ to fluoride coprecipitate $Y_{0.80}Yb_{0.19}Er_{0.01}F_3$ and the green light-emitting intensity in the luminescent material prepared from these raw materials.

Visible light-emitting spectra curve of $NaY_{0.80}Yb_{0.19}Er_{0.01}F_4$ under infrared stimulation at room temperature is shown in FIG. 1. The emission is due to the trivalent Er ion, and the change in the spectra curve shape by the Yb concentration or Er concentration is very slight. FIG. 2 is a curve illustrating the relation between the mixing molar ratio $x$ of the second raw material $Na_2SiF_6$ and the first raw material i.e., rare earth coprecipitate $Y_{0.80}Yb_{0.19}Er_{0.01}F_3$ (the molar ratio of the former to the latter) and the green light-emitting intensity is the product obtained by firing the raw materials at 630° C. for 1 hour.

Figure 3:
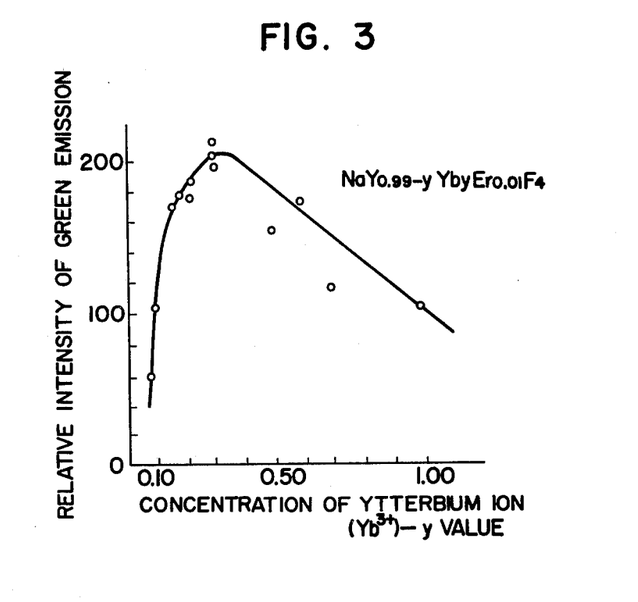
FIG. 3, which illustrates another embodiment of this invention, is a curve showing the relation between the Yb concentration $y$ and the green light-emitting efficiency in $NaY_{(0.99-y)}Yb_yEr_{0.01}F_4$.
Figure 4:
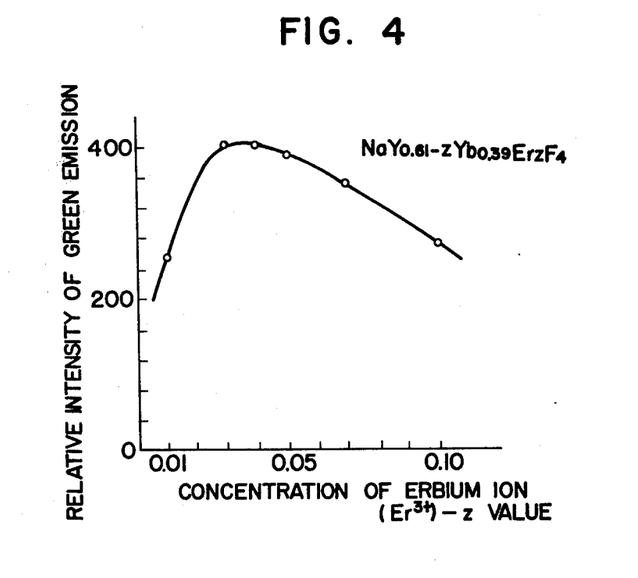
FIG. 4, which illustrates still another embodiment of this invention, is a curve illustrating the relation between the Er concentration $z$ and the green light-emitting intensity in $NaY_{0.61-z}Yb_{0.39}Er_zF_4$.
Figure 5:
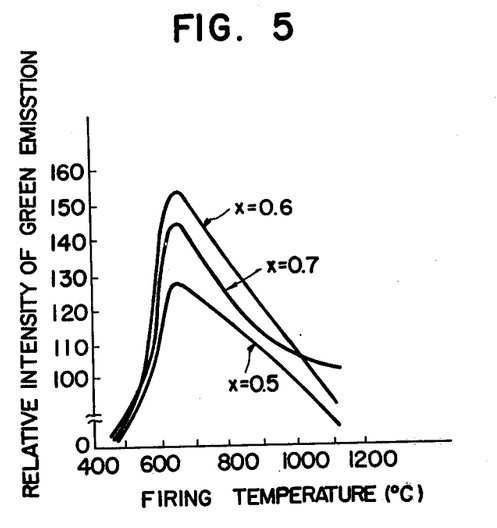
FIG. 5, which illustrates a further embodiment of this invention, is a curve showing the relation between the firing temperature and the green light-emitting intensity of the fired product in $NaY_{0.80}Yb_{0.19}Er_{0.01}F_4$ with respect to each of the mixing molar ratios $x$ of 0.5, 0.6 and 0.7.
Figure 6:
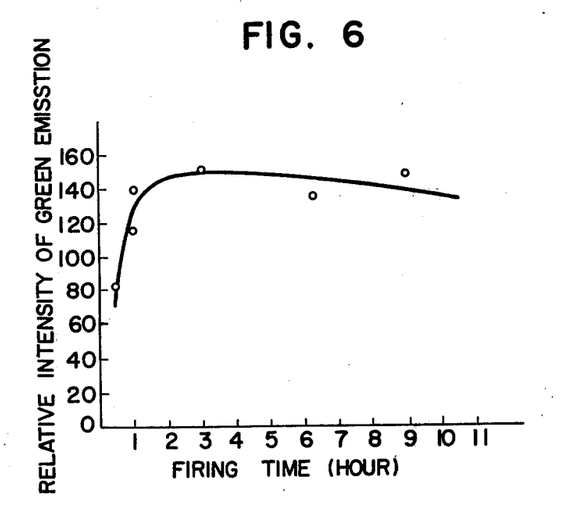
FIG. 6, which illustrates a still further embodiment of this invention, is a curve showing the relation betweem the firing time and the green light-emitting intensity of the fired product in $NaY_{0.80}Yb_{0.19}Er_{0.01}E_4$ with respect to the case where firing is conducted at 630° C. and at the mixing molar ratio $x$ of 0.60.

In each of the Figures other than FIG. 1, the emission intensity is expressed by the relative value calculated based on the green light-emitting intensity of the typical instance of commercially available known $LaF_3:Yb^{3+},Er^{3+}$ as being 100. The value $x$ (i.e., the molar or mol ratio) is preferably within the range of from 0.04 to 1.5, especially from 0.5 to 1.0. At the $x$ value approximating 0.6, a product having a maximum emission intensity is obtained. FIG. 3, is a curve illustrating the results of examination of the relation between the green light-emitting intensity and the $Yb^{3+}$ concentration $y$ under the conditions of the mixing molar ratio $x = 0.60$, the $Er^{3+}$ concentration $z = 0.01$, the firing temperature = 630° C. and the firing time = 1 hour. Preferred values of $y$ are from 0.09 to 0.99, and especially from 0.15 to 0.60. FIG. 4 is a curve illustrating the results of examination of the relation between the green light-emitting intensity and the $Er^{3+}$ concentration $z$ under the conditions of the mixing molar ratio $x = 0.60$, the $Yb^{3+}$ concentration $y = 0.39$, the firing temperature = 630° C. and the firing time = 3 hours. Preferred values of Z are from 0.01 to 0.10 and especially from 0.02 to 0.07. FIG. 5 is a curve showing the results of examination of the relation between the green light-emitting intensity and the firing temperature under the conditions of the mixing molar ratio $x = 0.5, 0.6$ or 0.7, respectively, the $Yb^{3+}$ concentration $y = 0.19$, the $Er^{3+}$ concentration $z = 0.01$ and the firing time = 1 hour. It is preferred that the firing is conducted at temperatures ranging from 600° to 950° C. FIG. 6 is a curve illustrating the relation between the green light-emitting intensity and the firing time under the conditions of the mixing molar ration $x = 0.60$, the $Yb^{3+}$ concentration $y = 0.19$, the $Er^{3+}$ concentration $z = 0.01$ and firing temperature = 630° C. It is desired that the firing is conducted for a period of time of at least 1 hour.

From FIG. 6 it is seen that the firing time gives great influence to the emission intensity of the resulting luminescent material. In case the firing time is 30 minutes, the emission intensity of the product is about 80; whereas the emission intensity reaches 120–140 when the firing is conducted for 1 hour, and the maximum value is obtained by about 3 hours of firing time. Accordingly, it is not worthwhile to prolong the firing time too much, and in practical operation it is effective and desirable to conduct the firing for about 1 to about 10 hours.

The invention will now be illustrated in greater detail by reference to the following Examples:

EXAMPLE 1

180.6 of yttrium oxide $Y_2O_3$, 74.9 g of ytterbium oxide $Yb_2O_3$ and 3.83 g of erbium oxide $Er_2O_3$, each of which has a purity of 99.999% are added to a liquid mixture of 550 ml of concentrated nitric acid and 200 ml of pure water, and the oxides are dissolved completely by agitation. Then, 320 ml of 50% hydrofluoric acid is added to the solution to coprecipitate the yttrium, ytterbium and erbium ions in the solution in the form of fluorides.

The supernatant liquor is flown out by inclining the vessel, and the remaining precipitate is water-washed by decantation, following which water is drained off and the precipitate is dried in the air at 200° C. for 48 hours.

The so obtained sample has a composition expressed by the formula $Y_{0.8}Yb_{0.19}Er_{0.01}F_3$, which is designated as coprecipitate raw material No. 1 (first raw material).

13.5 g of coprecipitate raw material No. 1 and 6.27g of sodium silicofluoride $Na_2SiF_6$ (second raw material) are well mixed together, and the mixture is charged in a lidded platinum crucible, in which the mixture is fired at 630° C. in a purified current of an argon atmosphere (flow rate = 500 ml/min) for 1 hour.

The fired product is characterized by the mixing molar ratio $x = 0.40$, the $Yb^{3+}$ concentration $y = 0.19$ and the $Er^{3+}$ concentration $z = 0.01$, and corresponds to the product wherein $x = 0.4$ shown in FIG. 2. As a result of the powder X-ray diffraction analysis, it has been confirmed that the product consists of $NaYF_4:Y_b^{3+},Er^{3+}$ (more specifically, $NaY_{0.8}Yb_{0.19}Er_{0.01}F_4$) having a crystal structure belonging to the space group $P\bar{6}$ and having small amounts of $YF_3:Yb^{3+},Er^{3+}$ and unreacted substance NaF.

EXAMPLE 2

9.03 g of the coprecipitate raw material No. 1 as heretofore prepared is well mixed with sodium silicofluoride $Na_2SiF_6$, and the mixture is fired in the same manner as in Example 1. The fired product is characterized by the mixing molar ratio $x = 0.60$, the $Yb^{3+}$ concentration $y = 0.19$ and the $Er^{3+}$ concentration $z = 0.01$, and corresponds to the product wherein $x = 0.6$ in FIG. 2. As a result of the powder X-ray diffraction analysis, it has been confirmed that the product consists of $NaYF_4:Yb^{3+},Er^{3+}$ (more specifically, $NaY_{0.8}Yb_{0.19}Er_{0.01}F_4$) having a crystal structure belonging to the space group $P\bar{6}$ and having a small amount of NaF.

EXAMPLE 3

2.17 of the coprecipitate raw material No. 1 is well mixed with 3.76 g of sodium silicofluoride $Na_2SiF_6$, and the mixture is fired in the same manner as in Example 1. The obtained product is characterized by the mixing molar ratio $x = 1.50$, the $Yb^{3+}$ concnetration $y = 0.19$ and the $Er^{3+}$ concentration $z = 0.01$, and corresponds to the case or product wherein $x = 1.5$ FIG. 2. As a result of the powder X-ray diffraction analysis, it has been confirmed that the product consists of $NaYF_4$:$Yb^{3+}$,$Er^{3+}$ (more specifically, $NaY_{0.8}Yb_{0.19}Er_{0.01}F_4$) having a crystal structure belonging to the space group $P\bar{6}$ and NaF.

EXAMPLE 4

5.42 g of coprecipitate raw material No. 1 is well mixed with 3.76 g of sodium silicofluoride $Na_2SiF_6$ and the mixture is charged in a lidded platinum crucible. The mixture is fired at 600° C. in a purified argon gas current (flow rate = 500 ml/min) for 1 hour. The fired product corresponds to the case wherein $x = 0.6$ and the firing temperature = 600° C. in FIG. 5. As a result of the powder X-ray diffraction analysis, it has been confirmed that the product consists of $NaYF_4$:$Yb^{3+}$,$Er^{3+}$ (more specifically, $NaY_{0.8}Yb_{0.19}Er_{0.01}F_4$) having a crystal structure belonging to the space group $P\bar{6}$ and a small amount of NaF.

EXAMPLE 5

In this example the materials employed in Example 4 and firing is carried out under the same conditions as in Example 4, except that the firing temperature is changed to 950° C. The fired product corresponds to the case of $x = 0.6$ and the firing temperature = 950° C. shown in FIG. 5. As a result of the powder X-ray diffraction analysis, it has been confirmed that the product consists of $NaYF_4$:$Yb^{3+}$,$Er^{3+}$ having a crystal structure belonging to the space group $P\bar{6}$ and a small amount of NaF.

EXAMPLE 6

The example is similar to Example 4 in that the firing is carried out under the same conditions as in Example 4, except that the firing period is prolonged to 10 hours. The molar mixing ratio $x$ of the material of Example 4 is again 0.60, and the fired product corresponds to the case of the firing time = 10 hours shown in FIG. 6. As a result of the powder X-ray diffraction analysis, it has been confirmed that the product consists of $NaYF_4$:$Yb^{3+}$,$Er^{3+}$ having a crystal structure belonging to the space group $P\bar{6}$ and a small amount of NaF.

EXAMPLE 7

40.6 g of yttrium oxide $Y_2O_3$, 7.1 g of ytterbium oxide $Yb_2O_3$ and 0.765 g of erbium oxide $Er_2O_3$, each of which has a purity of 99.999% are added to a liquid mixture of 110 ml of concentrated nitric acid and 40 ml of pure water, and the oxides are dissolved completely by agitation. Then, 60 ml of 50% hydrofluoric acid is added to the solution to coprecipitate the yttrium, ytterbium and erbium ions in the solution in the form of fluorides. The supernatant liquor is flown out by inclining the vessel, and the remaining precipitate is water-washed by decantation. Thereafter, water is drained off and the precipitate is dried in the air at 130° C. for 24 hours. The so formed product has a composition expressed by the formula $Y_{0.9}Yb_{0.09}Er_{0.01}F_3$ and is hereinafter designated as coprecipitate raw material No. 2 (first raw material).

5.15 g of coprecipitate raw material No. 2 is well mixed with 3.76 g of sodium silicofluoride $Na_2SiF_6$ (second raw material), and the mixture is charged in a lidded platinum crucible and fired at 660° C. for 3 hours in a purified argon gas current (flow rate = 500 ml/min.). The fired product is characterized by the mixing molar ratio $x = 0.60$, the $Yb^{3+}$ concentration $y = 0.09$ and the $Er^{3+}$ concentration $z = 0.01$, and corresponds to the case whereby $y = 0.09$ in FIG. 3. As a result of the powder X-ray diffraction analysis, it has been confirmed that the product consists of $NaYF_4$:$Yb^{3+}$,$Er^{3+}$ (more specifically, $NaY_{0.9}Yb_{0.09}Er_{0.01}F_4$) having a crystal structure belonging to the space group $P\bar{6}$ and a small amount of NaF.

EXAMPLE 8

An ytterbium-erbium fluoride coprecipitate having a composition expressed by the formula $Yb_{0.99}Er_{0.01}F_3$ is prepared from 78.0 g of ytterbium oxide $Yb_2O_3$ and 0.765 g of erbium oxide $Er_2O_3$, each of which has a purity of 99.999% in the same manner as employed for the synthesis of coprecipitate raw material No. 2 in Example 7. 7.67 g of this coprecipitate raw material (first raw material) is mixed with 3.76 g of sodium silicofluoride $Na_2SiF_6$, and the mixture is fired in the same manner as in Example 7. The fired product is characterized by the mixing molar ratio $x = 0.60$, the $Yb^{3+}$ concentration $y = 0.99$ and the $Er^{3+}$ concentration $z = 0.01$, and corresponds to the case wherein $y = 0.99$ in FIG. 3. As a result of the powder X-ray diffraction analysis, it has been confirmed that the product consists of $NaYbF_4$:$Er^{3+}$ (more specifically, $NaYb_{0.99}Er_{0.01}F_4$) having a crystal structure belonging to the space group $P\bar{6}$ and a small amount of NaF.

EXAMPLE 9

A fluoride coprecipitate having a composition expressed by the formula $Y_{0.6}Yb_{0.39}Er_{0.01}F_3$ is prepared from 27.1 g of yttrium oxide $Y_2O_3$, 30.7 g of ytterbium oxide $Yb_2O_3$ and 0.765 g of erbium oxide $Er_2O_3$, each of which has a purity of 99.999%, in the same manner as employed for the synthesis of coprecipitate raw material No. 2 in Example 7. A mixture of 5.99 g of the so formed coprecipitate raw material (first raw material) and 3.76 g of sodium silicofluoride $Na_2SiF_6$ (second raw material) is fired in the same manner as in Example 8. The fired product is characterized by the mixing molar ratio $x = 0.60$, the $Yb^{3+}$ concentration $y = 0.39$ and the $Er^{3+}$ concentration $z = 0.01$, and corresponds to the case wherein $z = 0.01$ in FIG. 4. As a result of the powder X-ray diffraction analysis, it has been confirmed that the product consists of $NaYF_4$:$Yb^{3-}$, $Er^{3+}$ (more specifically, $NaY_{0.6}Yb_{0.39}Er_{0.01}F_4$) having a crystal structure belonging to the space group $P\bar{6}$ and a small amount of NaF.

EXAMPLE 10

A fluoride coprecipitate having a composition expressed by the formula $Y_{0.58}Yb_{0.39}Er_{0.03}F_3$ is prepared from 26.2 g of yttrium oxide $Y_2O_3$, 30.7 g of ytterbium oxide $Yb_2O_3$ and 2.30 g of erbium oxide $Er_2O_3$, each of which has a purity of 99.999%, in the same manner as employed for the synthesis of coprecipitate raw material No. 2 in Example 7. A mixture of 6.04 g of the so formed coprecipitate raw material and 3.76 g of sodium silicofluoride $Na_2SiF_6$ is fired in the same manner as in Example 7. The fired product is characterized by the mixing molar ratio $x = 0.60$, the $Yb^{3+}$ concentration $y = 0.39$ and the $Er^{3+}$ concentration $z = 0.03$, and corresponds to the case wherein $z = 0.03$ in FIG. 4. As a result of the powder X-ray diffraction, it has been confirmed that this product consists of $NaYF_4:Yb^{3+}$, $Er^{3+}$ (more specifically, $NaY_{0.58}Yb_{0.39}Er_{0.03}F_4$) having a crystal structure belonging to the space group $P\bar{6}$ and a small amount of NaF.

EXAMPLE 11

A fluoride coprecipitate having a composition expressed by the formula $Y_{0.51}Yb_{0.39}Er_{0.10}F_3$ is prepared from 23.0 g of yttrium oxide $Y_2O_3$, 30.7 g of ytterbium oxide $Yb_2O_3$ and 7.64 g of erbium oxide $Er_2O_3$, each of which has a purity of 99.999%, in the same manner as employed for the synthesis of coprecipitate raw material No. 2 in Example 7. A mixture of 6.25 g of the so formed coprecipitate raw material and 3.76 g of sodium silicofluoride $Na_2SiF_6$ is fired in the same manner as in Example 8.

The resulting fired product is characterized by the mixing molar ratio $x = 0.60$, the $Yb^{3+}$ concentration $y = 0.39$ and the $Er^{3+}$ concentration $z = 0.10$, and corresponds to the case wherein $z = 0.10$ in FIG. 4. As a result of the powder X-ray diffraction analysis, it has been confirmed that the product consists of $NaYF_4:Yb^{3+}$, $Er^{3+}$ (more specifically, $NaY_{0.51}Yb_{0.39}Er_{0.10}F_4$) having a crystal structure belonging to the space group $P\bar{6}$ and a small amount of NaF.

EXAMPLE 12

A fluoride coprecipitate having a composition expressed by the formula $La_{0.8}Yb_{0.19}Er_{0.01}F_3$ (which is designated as coprecipitate raw material No. 3) is prepared from 52.1 g of lanthanum oxide $La_2O_3$, 14.9 g of ytterbium oxide $Yb_2O_3$ and 0.765 g of erbium oxide $Er_2O_3$, each of which has a purity of 99.999%, in the same manner as employed for the synthesis of coprecipitate raw material No. 2 in Example 7. A mixture of 6.76 g of coprecipitate raw material No. 3 and 3.76 g of sodium silicofluoride $Na_2SiF_6$ is fired in the same manner as in Example 1. The fired product is characterized by mixing molar ratio $x = 0.60$, and consists of a luminescent material having a crystal structure belonging to the space group $P\bar{6}$ and a composition expressed by the formula $NaLa_{0.80}Yb_{0.19}Er_{0.01}F_4$ and a small amount of NaF. The green-emitting intensity of the product under infrared stimulation is about 68% of that of the product of Example 2, and its spectrum shape is almost identical with that shown in FIG. 1.

EXAMPLE 13

A fluoride coprecipitate having a composition expressed by the formula $Gd_{0.8}Yb_{0.19}Er_{0.01}F_3$ (which is designated as coprecipitate raw material No. 4) is prepared from 58.0 g of gadolinium oxide $Gd_2O_3$, 14.9 g of ytterbium oxide $Yb_2O_3$ and 0.765 g of erbium oxide $Er_2O_3$, each of which has a purity of 99.999%, in the same manner as employed for the synthesis of coprecipitate raw material No. 2 in Example 7. A mixture of 7.25 g of coprecipitate raw material No. 4 and 3.76 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaGd_{0.80}Yb_{0.19}Er_{0.01}F_4$ and a small amount of NaF. The green emitting intensity of the product under infrared stimulation is about 84% of that of the product of Example 2, and its spectrum shape is almost identical with that shown in FIG. 1.

EXAMPLE 14

12.7 g of lutetium oxide $Lu_2O_3$, 2.98 g of ytterbium oxide $Yb_2O_3$ and 0.153 g of erbium oxide $Er_2O_3$, each of which has a purity of 99.999%, are added to a liquid mixture of 25 ml of concentrated nitric acid and 10 ml of pure water, and the oxides are dissolved completely by agitation. Then, 12 ml of 50% hydrofluoric acid is added to the solution to coprecipitate the lutetium, ytterbium and erbium ions in the solution in the form of fluorides. The coprecipitate is then treated in the same manner as employed for the synthesis of coprecipitate raw material No. 2 in Example 7. Thus is obtained a fluoride coprecipitate having a composition expressed by the formula $Lu_{0.8}Yb_{0.19}Er_{0.01}F_3$ (which is designated as coprecipitate raw material No. 5). A mixture of 3.86 g of coprecipitate raw material No. 5 and 1.88 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaLu_{0.80}Yb_{0.19}Er_{0.01}F_4$ and a small amount of NaF. The shape of the emission spectrum of the product under infrared stimulation is almost identical with that shown in FIG. 1.

EXAMPLE 15

A mixture of 5.41 g of coprecipitate raw material No. 1, 6.76 g of coprecipitate raw materials No. 3 and 7.52 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaY_{0.40}La_{0.40}Yb_{0.19}Er_{0.01}F_4$, and a small amount of NaF. The green-emitting intensity of the product under infrared stimulation is almost equal to that of the product of Example 12.

EXAMPLE 16

A fluoride coprecipitate having a composition expressed by the formula $Y_{0.40}Gd_{0.40}Yb_{0.19}Er_{0.01}F_3$ is prepared from 29.0 g of gadolinium oxide $Gd_2O_3$, 18.1 g of yttrium oxide $Y_2O_3$, 14.9 g of ytterbium oxide $Yb_2O_3$ and 0.765 g of erbium oxide $Er_2O_3$, each of which has a purity of 99.999%, in the same manner as employed for the synthesis of coprecipitate raw material No. 2 in Example 7. A mixture of 12.7 g of the so formed coprecipitate raw material and 7.52 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaY_{0.40}Gd_{0.40}Yb_{0.19}Er_{0.01}F_4$ and a small amount of NaF. The green-emitting intensity of the product under infrared stimulation is almost equal to that of the product of Example 13.

EXAMPLE 17

A mixture of 2.71 g of coprecipitate raw material No. 1 3.86 g of coprecipitate raw material No. 5 and 3.76 g of sodium silicofluoride $Na_2SiF_6$ is fired in the same manner as in Example 1.

The mixing molar ratio $x$ is 0.60, and the fired product consists of a luminescent material having a crystal structure belonging to the space group $P\bar{6}$ and a composition expressed by the formula $NaLa_{0.40}Gd_{0.40}Yb_{0.19}Er_{0.01}F_4$ and a small amount of NaF. The green-emitting intensity of the product under infrared stimulation is almost equal to that of the product of Example 12.

EXAMPLE 18

A mixture of 3.38 g of coprecipitate raw material No. 3, 3.63 g of coprecipitate raw material No. 4 and 3.76 g of sodium silicofluoride $Na_2SiF_6$ is fired in the same manner as in Example 1.

The mixing molar ratio $x$ is 0.60, and the fired product consists of a luminescent material having a crystal structure belonging to the space group $P\bar{6}$ and a composition expressed by the formula $NaLa_{0.40}Gd_{0.40}Yb_{0.19}Er_{0.01}F_4$ and a small amount of NaF. The green-emitting intensity of the product under infrared stimulation is almost equal to that of the product of Example 12.

EXAMPLE 19

A mixture of 3.38 g of coprecipitate raw material No. 3, 3.86 g of coprecipitate raw material No. 5 and 3.76 g of sodium silicofluoride $Na_2SiF_6$ is fired in the same manner as in Example 1.

The mixing molar ratio $x$ is 0.60, and the fired product consists of a luminescent material having a crystal structure belonging to the space group $P\bar{6}$ and a composition expressed by the formula $NaLa_{0.40}Lu_{0.40}Yb_{0.19}Er_{0.01}F_4$ and a small amount of NaF. The green-emitting intensity of the product under infrared stimulation is almost equal to that of the product of Example 12.

EXAMPLE 20

A mixture of 3.63 g of coprecipitate raw material No. 4, 3.86 g of coprecipitate raw material No. 5 and 3.76 g of sodium silicofluoride $Na_2SiF_6$ is fired in the same manner as in Example 1.

The mixing molar ratio $x$ is 0.60. and the fired product consists of a luminescent material having a crystal structure belonging to the space group $P\bar{6}$ and a composition expressed by the formula $NaLu_{0.40}Gd_{0.40}Yb_{0.19}Er_{0.01}F_4$ and a small amount of NaF. The green-emitting intensity of the product under infrared stimulation is almost equal to that of the product of Example 13.

Example 21

A fluoride coprecipitate having a composition expressed by the formula $Y_{0.8/3}Gd_{0.8/3}La_{0.8/3}Yb_{0.19}Er_{0.01}F_3$ is prepared from 12.0 g of yttrium oxide $Y_2O_3$, 19.3 g of gadolinium oxide $Gd_2O_3$, 17.4 g of lanthanum oxide $La_2O_3$, 14.9 g of ytterbium oxide $Yb_2O_3$ and 0.765 g of erbium oxide $Er_2O_3$, each of which has a purity of 99.999%, in the same manner as employed for the synthesis of coprecipitate raw material No. 2 in Example 7. A mixture of 6.47 g of the so formed fluoride coprecipitate and 3.76 g of sodium silicofluoride $Na_2SiF_6$ is fired in the same manner as in Example 1.

The mixing molar ratio $x$ is 0.6, and the product consists of a luminescent material having a crystal structure belonging to the space group $P\bar{6}$ and a composition expressed by the formula $NaY_{0.8/3}Gd_{0.8/3}La_{0.8/3}Yb_{0.19}Er_{0.01}F_4$ and a small amount of NaF. The green-emitting intensity of the product under infrared stimulation is almost equal to that of the product of Example 12.

EXAMPLE 22

A mixture of 1.80 g coprecipitate raw material No. 1, 2.26 g of coprecipitate raw material No. 3, 2.58 g of coprecipitate raw material No. 5 and 3.76 g of sodium silicofluoride $Na_2SiF_6$ is fired in the same manner as in Example 1. The mixing molar ratio $x$ is 0.60, and the fired product consists of a luminscent material having crystal structure belonging to the space group $P\bar{6}$ and a composition expressed by the formula $NaY_{0.8/3}La_{0.8/3}Lu_{0.8/3}Yb_{0.19}Er_{0.01}F_4$ and a small amount of NaF. The green-emitting intensity of the product under infrared stimulation is almost equal to that of the product of Example 12.

EXAMPLE 23

A mixture of 1.80 g of coprecipitate raw material No. 1, 2.42 g of coprecipitate raw material No. 4, 2.58 g of coprecipitate raw material No. 5 and 3.67 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaY_{0.8/3}Gd_{0.8/3}Lu_{0.8/3}Yb_{0.19}Er_{0.01}F_4$ and a small amount of NaF. The green-emitting intensity of the product under infrared stimulation is almost equal to that of the product of Example 12.

EXAMPLE 24

A mixture of 2.26 g of coprecipitate raw material No. 3, 2.42 g of coprecipitate raw material No. 4, 2.58 g of coprecipitate raw material No. 5 and 3.76 g of sodium silicofluoride $Na_2SiF_6$ is fired in the same manner as in Example 1. The mixing molar ratio $x$ is 0.60, and the fired product consists of a luminescent material having a crystal structure belonging to the space group $P\bar{6}$ and a composition expressed by the formula $NaLa_{0.8/3}Gd_{0.8/3}Lu_{0.8/3}Yb_{0.19}Er_{0.01}F_4$ and a small amount of NaF. The green-emitting intensity of the product under infrared stimulation is almost equal to that of the product of Example 12.

EXAMPLE 25

A mixture of 1.35 g of coprecipitate raw material No. 1, 1.69 g of coprecipitate raw material No. 3, 1.81 g of coprecipitate raw material No. 4, 1.93 g of coprecipitate raw material No. 5 and 3.76 g of sodium silicofluoride $Na_2SiF_6$ ratio $x$ is 0.60, and the fired product consists of a luminescent material having a crystal structure belonging to the space group $P\bar{6}$ and a composition expressed by the formula $NaY_{0.2}La_{0.2}Gd_{0.2}Lu_{0.2}Yb_{0.19}Er_{0.01}F_4$ and a small amount of NaF. The green-emitting intensity of the product under infrared stimulation is almost equal to that of the product of Example 12.

EXAMPLE 26

25.7 g of ytrrium oxide $Y_2O_3$, 30.7 g of ytterbium oxide $Yb_2O_3$ and 3.06 g of erbium oxide $Er_2O_3$, each of which has a purity of 99.999%, are added to a liquid mixture of 150 ml of concentrated nitric acid and 150 ml of pure water, and the oxides are dissolved completely therein by agitation. Then, 280 ml of 50% hydrofluoric acid is added to the solution to coprecipitate the yttrium, ytterbium and erbium ions in the solution in the form of fluorides. At the above operation, a beaker of polyethyene is used as the vessel. The supernatant liquor is flown out by inclining the vessel, and the remaining precipitate is water-washed several times by decantation and dried in the art at 120° C. for one day. The resulting sample has a composition expressed by the formula $Y_{0.57}Yb_{0.39}Er_{0.04}F_3$, which is designated as coprecipitate raw material No. 6 (first raw material).

6.07 g of coprecipitate raw material No. 6 is well mixed with 3.76 g of sodium silicofluoride $Na_2SiF_6$, and the mixture is charged with a platinum crucible at the bottom of which 0.94 g of sodium silicofluoride $Na_2SiF_6$ is packed. The crucible is sealed and the firing is effected at 630° C. for 3 hours in an argon gas current. In case a perforated platinum plate is placed above $Na_2SiF_6$ packed in advance at the bottom of the crucible, separation of the resulting luminescent material and NaF after the firing treatment can be facilitated. However, even when a spacer such as a platinum plate is not inserted, since the luminescent material layer is colored in pink and the NaF layer is white, and since each layer takes a fairly sintered solid form, their separation can be accomplished with ease. The so formed luminescent material has a composition expressed by the formula $NaY_{0.57}Yb_{0.39}Er_{0.04}F_4$ and has an infrared-to-green converting efficiency higher by 20% on the average than a luminescent material obtained by conducting the firing similarly but without charging $Na_2SiF_6$ at the bottom of the crucible.

EXAMPLE 27

A mixture of 7.25 g of coprecipitate raw material No. 4 and 3.76 g of sodium silicofluoride $Na_2SiF_6$ is fired in the same manner as in Example 26. The fired product consists of a luminescent material having a composition expressed by the formula $NaGd_{0.80}Yb_{0.19}Er_{0.01}F_4$ and a small amount of NaF. The sample product obtained by conducting the firing with 2 g of sodium silicofluoride $Na_2SiF_6$ charged at the bottom of the crucible has an infrared-to-green converting efficiency higher by 15% on the average than the sample product obtained by conducting the firing without charge of $Na_2SiF_6$ at the crucible bottom.

EXAMPLE 28

A mixture of 6.76 g of coprecipitate raw material No. 3 and 3.76 g of sodium silicofluoride $Na_2SiF_6$ is fired in the same manner as in Example 26. The fired product consists of a luminescent material having a composition expressed by the formula $NaLa_{0.80}Yb_{0.19}Er_{0.01}F_4$ and a small amount of NaF. The sample product obtained by conducting the firing with 1 g of $Na_2SiF_6$ charged at the bottom of the crucible has an infrared-to-green converting efficiency higher by 15% on the average than the sample product obtained by conducting the firing without charge of $Na_2SiF_6$ at the crucible bottom.

EXAMPLE 29

A mixture of 3.86 g of coprecipitate raw material No. 5 and 1.8 g of sodium silicofluoride $Na_2SiF_6$ is fired in the same manner as in Example 26. The fired product consists of a luminescent material having a composition expressed by the formula $NaLu_{0.80}Yb_{0.19}Er_{0.01}F_4$ and a small amount of NaF. The sample produce obtained by conducting the firing with 1 g of $Na_2SiF_6$ charged at the bottom of the crucible has an infrared-to-green converting efficiency higher by 10% on the average than the sample product obtained by conducting the firing without charge of $Na_2SiF_6$ at the crucible bottom.

EXAMPLE 30

In the same manner as adopted in Example 16, a fluoride coprecipitate having a composition expressed by the formula $Y_{0.40}Gd_{0.40}Yb_{0.19}Er_{0.01}F_3$ is prepared. A mixture of 12.7 g of this coprecipitate raw material and 7.52 g of sodium silicofluoride $Na_2SiF_6$ is fired in the same manner as in Example 26. The fired product consists of a luminescent material having a composition expressed by the formula $NaY_{0.40}Gd_{0.40}Yb_{0.19}Er_{0.01}F_4$ and a small amount of NaF. The sample product obtained by conducting the firing with 3 g of $Na_2SiF_6$ charged at the bottom of the crucible has an infrared-to-green converting efficiency higher by 15% on the average than the sample product obtained by conducting the firing without charge of $Na_2SiF_6$ at the crucible bottom.

As is seen from the foregoing detailed explanation, an accordance with this invention, a novel substance (1) having a higher emission efficiency under infrared stimulation than known green-emitting, infrared-to-visible converting phosphors, which has a hexagonal crystal structure belonging to the space group $P\bar{6}$ and a composition expressed by the formula $NaLn_{1-y-z}Yb_yEr_zF_4$ (in which Ln is at least one element selected from the group consisting of Y, La, Gd and Lu) can be prepared by a method (2) comprising mixing a coprecipitated fluoride of Yb, Er and at least one element selected from the group consisting of Y, La, Gd and Lu with $Na_2SiF_6$, and firing the mixture of a temperature of 600° to 950° C. for a period of time of 1 to 10 hours in an oxygen-free atmosphere such, for instance, as a neutral gas, or a method (3) comprising firing said mixture of the rare earth fluoride coprecipitate and $Na_2SiF_6$ under the same temperature, atmosphere and time conditions as in said method (2) in such a state that said mixture is placed above $Na_2SiF_6$ packed in advance at the bottom of a firing crucible.

While the novel principles of the invention have been described, it will be understood that various omissions, modifications and changes in these principles may be made by one skilled in the art without departing from the spirit and scope of the invention.

What we claim is:

1. A method for producing a luminescent material consisting essentially of a sodium rare earth fluoride having a hexagonal crystal structure and a composition expressed by the following general formula:

$$NaLn_{1-y-z}Yb_yEr_zF_4$$

wherein Ln represents at least one element selected from the group consisting of yttrium, lanthanum, gadolinium and lutetium, and y and z are numerical values defined by the following relationship:

$0.09 \leq y \leq 0.99,$
$0.01 \leq z = 0.10,$ and
$Y + z \leq 1,$ said method comprising the steps of
a. preparing an acidic aqueous solution containing rare earth ions in a composition expressed by the following general formula:

$$Ln_{1-y-z}Yb_yEr_z$$

wherein Ln represents at least one element selected from the group consisting of yttrium, lanthanum, gadolinium and $y$ and $z$ are numerical values defined by the following relationships:

$0.09 \leq y \leq 0.99$,
$0.01 \leq z \leq 0.10$, and
$y + z \leq 1$, b. adding a fluorine ion as a precipitant to said acidic aqueous solution and thereby coprecipitating said rare earth ions in the form of fluorides to form a first raw material consisting of a rare earth fluoride coprecipitate having a composition expressed by the following general formula:

$Ln_{1-y-z}Yb_yEr_zF_3$ wherein Ln, $y$ and $z$ are as defined above, c. mixing the first raw material with sodium silicofluoride $Na_2SiF_6$ as a second raw material, the molar ratio of said second raw material to said first raw material being in the range of from 0.4 to 1.5, and d. packing the resultant mixture in a crucible at the bottom of which powder of sodium silicofluoride $Na_2SiF_6$ has been charged in advance, in a manner such that the mixture of the raw materials is placed above the powder of sodium silicofluoride, and firing the contents of the crucible at a temperature of from 600° to 950° C. for a period of time of at least 1 hour in an oxygen-free atmosphere.

2. A method for producing a luminescent material according to claim 1 wherein the amount of sodium silicofluoride charged at the bottom of the crucible is 10 to 50 mole % based on the sum of mole numbers of the mixture of said first and second raw materials.

3. A method for producing a luminescent material according to claim 1, wherein the molar ratio of said second raw material to said first raw material is about 0.6.

4. A method for producing a luminescent material according to claim 1, wherein the molar ratio of said second raw material to said first raw material is in the range of from 0.5 to 1.0.

5. A method for producing a luminescent material according to claim 1, wherein the firing is conducted for a period of time of 1 to 10 hours.

6. A method for producing a luminescent material according to claim 1, wherein the firing is carried out in an argon gas atmosphere.

* * * * *